US007593751B2

(12) United States Patent
Barbosa et al.

(10) Patent No.: US 7,593,751 B2
(45) Date of Patent: *Sep. 22, 2009

(54) CONDUCTING FIELD OPERATIONS USING HANDHELD DATA MANAGEMENT DEVICES (75) Inventors: Frank A. Barbosa, Carrollton, TX (US); Luis M. Ortiz, Dallas, TX (US)

(73) Assignee: Field Data Management Solutions, LLC, Albuquerque, NM (US)

( * ) Notice: Subject to any disclaimer, the term of this patent is extended or adjusted under 35 U.S.C. 154(b) by 547 days.

This patent is subject to a terminal disclaimer.

(21) Appl. No.: 11/262,699

(22) Filed: Oct. 31, 2005

(65) Prior Publication Data

US 2007/0095887 A1    May 3, 2007

Related U.S. Application Data

(63) Continuation of application No. 09/955,543, filed on Sep. 17, 2001, now Pat. No. 6,961,586.

(60) Provisional application No. 60/233,120, filed on Sep. 18, 2000.

(51) Int. Cl.
*H04M 1/00* (2006.01)
*G06Q 10/00* (2006.01)

(52) U.S. Cl. .................. 455/556.1; 455/566.2; 455/90.3

(58) Field of Classification Search .............. 455/556.1, 455/556.2, 66.1, 90.01, 90.02, 90.03; 705/1; 715/733, 964, 210; 709/203
See application file for complete search history.

(56) References Cited

U.S. PATENT DOCUMENTS

| 5,444,615 | A | 8/1995 | Bennett et al. ............ 364/401 |
| 5,561,446 | A | 10/1996 | Montlick .................... 345/173 |
| 5,935,209 | A * | 8/1999 | Budhraja et al. ............ 709/223 |
| 5,990,932 | A | 11/1999 | Bee et al. .................... 348/15 |
| 6,064,968 | A | 5/2000 | Schanz ........................ 705/1 |
| 6,083,353 | A * | 7/2000 | Alexander, Jr. ............ 202/158 |
| 6,192,381 | B1 * | 2/2001 | Stiegemeier et al. ........ 715/210 |
| 6,317,039 | B1 * | 11/2001 | Thomason .................. 340/505 |
| 6,650,647 | B1 | 11/2003 | Ishikawa et al. ............ 370/400 |
| 6,662,193 | B1 | 12/2003 | Christensen ............. 707/104.1 |
| 6,971,063 | B1 * | 11/2005 | Rappaport et al. .......... 715/733 |

FOREIGN PATENT DOCUMENTS

JP    408055161 A    2/1996

* cited by examiner

*Primary Examiner*—Melur Ramakrishnaiah (57) ABSTRACT

Providing users in the field includes portable access to industry-specific programs, instructions and data. Field data synchronization and/or delivery is enabled using wireless capabilities resident in handheld personal computing devices. Data can be synchronized with a server over a network using wireless radio transmission, or directly to a computer workstation using wireless infrared or radio transmission or connected physical connection. Two-way communications is provided between remote computers and handheld data management devices to facilitate real-time access to remote programs, assistance and/or information related to the field assessment being undertaken by using a handheld data management device user. Field data management includes activities for at least one of: construction industry project analysis, HVAC system analysis, project management, equipment readiness inspection, troubleshooting, inventory tracking, inventory ordering, sales (e.g., providing cost estimates to customers), customer invoicing, conducting legal investigations, field data collection, and multi-user remote function coordination.

18 Claims, 9 Drawing Sheets

CONDUCTING FIELD OPERATIONS USING HANDHELD DATA MANAGEMENT DEVICES

APPLICATION PRIORITY

This application is a continuation of nonprovisional patent application Ser. No. 09/955,543 now U.S. Pat. No. 6,961,586, entitled "Field Assessment Using Handheld Data Management Devices", filed Sep. 17, 2001, which claims priority to Provisional Patent Application, Ser. No. 60/233,120, entitled "Field Assessment Using Handheld Data management Devices," filed Sep. 18, 2000.

FIELD OF THE INVENTION

The present invention is generally related to applications for handheld data management devices (e.g., personal digital assistants, handled computers, two-way pagers, Web/WAP-enabled telephony, etc.). More particularly, the present invention is related to systems for and methods of conducting field assessments utilizing handheld data management devices.

BACKGROUND

One problem with growth and demand for services in many of the professions, trades and industries wherein field operations (e.g., assessments, estimates or appraisals) are required is that less experienced personnel may be undertaking the initial tasks of data collection and, sometimes, the analysis and troubleshooting of problems in the field. Field personnel are usually required to collect data regarding a situation in the field that can later be used by more senior, experienced and/or responsible personnel to make decisions (business, technical, administrative and/or political). Even the most experienced professionals may find themselves lacking access to critical information or support that would be helpful in undertaking field operations.

Individuals in the construction industry, for example, are often responsible for carrying out field assessments and estimates. The consequences of under bidding a project in the construction field can be very costly and/or can affect performance and quality of services/activities related to the under-bid project. In cases where a project cost estimate, or bid, must be provided for a construction project, a business owner or senior journeymen can oftentimes be compelled to personally go the field and collect information regarding a project in order to render a realistic and profitable bid because an inexperienced estimators can render inaccurate appraisals. Construction project estimates require an accurate assessment and analysis of a job-site/projects in order to develop the data/facts necessary for an estimate to be rendered regarding use of labor, materials and completion time for a project.

If an operator in the field was provided with guidance, access to supplemental information and/or years of experience (e.g., lessons learned by senior personnel), field operations might proceed more accurately and professionally. Field operators, however, are unlikely to have reasonable means to efficiently access the information or the information can not be updated. Materials typically used in the field can include reference materials such as codes, regulations, inventory and price lists.

Personal digital assistant (PDA) is the generic name used for a device belonging to a family of portable handheld data managing devices well known in the art. Currently, handheld data management devices such as PDAs or Palm PCs can have as much computing power as some desktop personal computers and can be used in a wide variety of applications, including wireless communication (infrared and radio frequency), GPS (global positioning system) mapping, Internet access and database storage. Web-phones are also being introduced into the wireless marketplaces that have PDA-like capabilities.

Handheld data management devices are generally enabled with connectivity to data sources over, for example, the connection-oriented Transmission Control Protocol/Internet Protocol (TCP/IP) or message oriented TME/X protocol. Cellular Digital Packet Data (CDPD) is a TCP/IP based technology that supports Point-to-Point Protocol (PPP) or Serial Line Internet Protocol (SLIP) wireless connections to mobile devices. Cellular service is generally available throughout the world from major service providers. With CDPD, data can be transferred over switched PSTN circuits or packet-switched networks. Currently, CDPD supports data transmissions up to 19.2 Kbps. Global System for Mobile Communication (GSM) and Personal Communications Systems (PCS) networks operate in the 800 MHz, 900 MHz, and 1900 MHz range. PCS provides narrowband digital communications in the 900 MHz range for paging, and broadband digital communications in the 1900 MHz band for cellular telephone service. In the U.S., PCS 1900 is identical to GSM 1900. GSM operates in the 900 MHz, 1800-1900 MHz frequency bands. GSM 1800 is widely used throughout Europe and throughout many parts of the world. In the U.S., GSM 1900 is the same as PCS 1900; thus, these two technologies are compatible.

Currently, GSM networks support data speeds up to 9.6 Kbps. The Code Division Multiple Access (CDMA) network is a digital wireless network that defines how a single channel can be segmented into multiple channels using a pseudo random signal (or code) to identify each user=s information. Because CDMA spread each call over more than 4.4 trillion channels across the entire frequency band, it is more immune to interference than TDMA or other current wireless networks and can support more users per channel in some situations. Time Division Multiple Access (TDMA) cellular/wireless systems are currently deployed throughout the wireless communication markets. Currently, some networks support data at speeds up to 14.4 Kbps. Wideband CDMA (W-CDMA), which is called CDMA 2000 in North America, will be implemented in the U.S.A in the near future. W-CDMA is a true 3G wireless technology. W-CDMA increases transfer rates by using multiple 1.25 MHz cellular channels compared to the single channel currently used by CDMA 1.

The General Packet Radio Service (GPRS) network is a 2.5G technology that bridges the gap between the current wireless technologies and the next generation of wireless technologies known as 3G wireless technologies. GPRS is a packet-data transmission technology that will initially provide data transfer rates up to 115 Kbps. GPRS will work with CDMA and TDMA, and it supports X.25 and IP communications protocols. It will also enable features like Voice over IP (VOIP) and multimedia services. Bluetooth is a Personal Area Network (PAN) technology. Adopted by a consortium of wireless equipment manufacturers called the Bluetooth Special Interest Group (BSIG), it is emerging as a global standard for low cost wireless data and voice communication. The current specification for this standard is the 2.4 GHz ISM frequency band.

Bluetooth technology is based on a short-range radio transmitter/receiver built into small application specific circuits (ASICS) and embedded into support devices. Initially, Bluetooth enabled devices will have 1 mw of transmitter power and will be capable of asymmetrical data transfers of up to 721 Mbps over distances of 10M. The Bluetooth specification permits up to 100 mw of power, which will increase the range to 100M. In addition, it can support up to three voice channels. Using short data packets and frequency hopping of up to 1600 hops per second, it is a true 3G wireless technology that will enable a host of new applications and possibilities for wireless data communication. Wireless application protocol (WAP) and Extensible Markup Language (XML) are examples of current technology being used in wireless devices and system to provide Web-based (Internet) content on wireless devices.

Despite the growing power and popularity of portable data management devices and the diverse telecommunications alternatives for data communication, few applications are available today that directly relate to interactive or industry-specific programs providing management of associated data and providing users with access to daily business practices and procedures related to a particular industry.

What is apparently needed in industries requiring field assessments is access to industry-specific programs, information and/or support that can enable field operators (e.g., users, operators, estimators, investigators, salesmen, and the like) to more efficiently and accurate operate in the field.

SUMMARY OF THE INVENTION

It is an object of the present invention to provide methods for executing field operations using handheld devices.

It is an aspect of the present invention to provide field operators portable access to industry-specific field data management programs ("programs") and data useful in carrying out field operations.

It is another aspect of the present invention provides a handheld data management device and solutions for assisting personnel in conducting field operations.

It is another aspect of the present invention to provide methods for field operations data synchronization and/or delivery using wireless capabilities resident in handheld personal computing devices. Data can be synchronized with a server over a network using wireless radio transmission, or directly to a computer workstation using wireless infrared or radio transmission or connected means (e.g., modems, cradles, docking stations).

It is another aspect of the present invention to provide for two-way communication between remote computing means (e.g., servers, desktop computers) and handheld data management devices to facilitate real-time access to remote programs, assistance and/or information related to the field operations being undertaken by using a handheld data management device user.

A handheld device for use in the management of data during operations in the field can include a memory for storing at least one field data management program and related data; a microprocessor for executing said at least one field data management program; at least one field data management program stored within said memory and including instructions for enabling its user to: find a field location, collect data at the field location, communicate with a remote server while at the field location, retrieve new data from the server that is associated with the collected data; a wireless communication module for providing access to the remote server by said handheld data management device; and a user interface adapted for enabling the handheld data management device user to interact with said at least one field data management program.

A programming module containing field data management software can include software used to accomplish at least one of: construction industry project analysis, HVAC system analysis, project management, equipment readiness inspection, troubleshooting, inventory tracking, inventory ordering, sales (e.g., providing cost estimates to customers), customer invoicing, conducting legal investigations, field data collection, and multi-user remote function coordination.

A method of conducting a field operations using a handheld data management device can include the steps of providing access to a industry-specific field operations program module; executing said program module to conduct a field operation; providing field-specific information required by said program module for said program module to render data from said module useful in support of said operations; and retrieving data from said handheld data management device in support of said operations. The method can further include providing data to a remote resource (e.g., server or live expert) for analysis, and retrieving enhanced data from said remote resource for use in conducting the field operations.

A method of conducting operations in the field utilizing a handheld data management device, can also include the steps of obtaining direction to a field problem using positioning and navigation means provided through said handheld data management device; starting a program associated with the field problem; providing specific information required by the field data management program and related to the field problem; analysis of said specific information by said handheld data management device; and rendering output by said handheld data management device for use in support of said field problem.

The foregoing has outlined some of the more pertinent features of the present invention. These features should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention can be had by referring to the following Detailed Description of the preferred embodiment.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF PREFERRED EMBODIMENTS

The present invention now is described more fully hereinafter with reference to the accompanying drawings, in which preferred embodiments of the invention are shown. Like numbers refer to like elements throughout. This invention can, however, be embodied in many different forms and should not be construed as limited to the embodiments set forth herein; rather, these embodiments are provided so that this disclosure will be thorough and complete, and will fully convey the scope of the invention to those skilled in the art. Aspects of the present invention are directed to assisting people in the field with operating in the field and, for example, rendering accurate assessments of a field situation, job, environment, customer contact, project, etc. Reference to a particular field environment (e.g., projects within the construction industry) made throughout the description are provided for exemplary purposes only and should not be taken as a limitation of the present invention. The present invention provides portable, handheld data management devices (e.g., handheld or palm computer/PC, PDA, mobile telephony devices) with access to industry/profession-specific processes and applications to enable users to be more productive while operating in the field.

Figure 1:
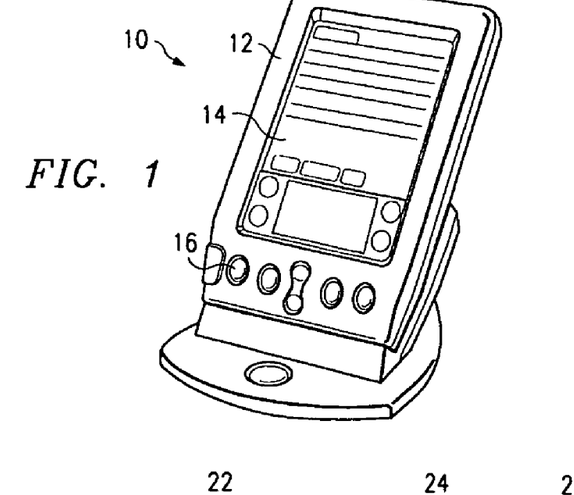
FIG. 1 is a perspective view of a portable electronic device usable in accordance with carrying of methods of the present invention.

A handheld data management device in accordance with the present invention can be in the form of any one of a number of commercially available hand-held devices such as personal digital assistants (PDAs), two-way pagers, and Web/WAP-enabled mobile phones. Referring to FIG. 1, a device 10 exemplary of a prior art PDA that could implement software and/or communication methods in accordance with carrying out methods of the invention is illustrated. The device 10 includes an outer housing 12 sufficiently small to be easily portable such that it substantially fit within the palm of a users hand, a display 14 that can also preferably include touchscreen technology to operate in combination with control buttons 16 to provide a User Interface (UI) for operating, controlling and/or otherwise interacting with the device 10. Not shown on the device 10, but well known in the art to be incorporated in such devices are communication ports (wired and wireless).

Figure 2:
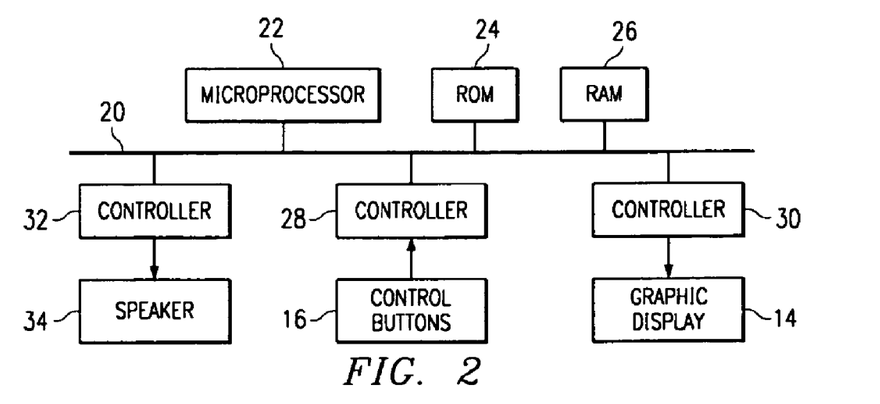
FIG. 2 is a block diagram of various components of the device.

FIG. 2 is a block diagram of various components of the device 10. The device 10 includes a system bus or plurality of system buses 20 to which various resident components are coupled and by which communication between the various components is accomplished. A processor 22 is connected to the system bus 20 and is supported by a read only memory (ROM) 24 and a random access memory (RAM) 26. The ROM 24 contains among other code the code controlling basic hardware operations. The RAM 26 is the main memory into which the operating system and application programs are loaded. Also connected to this system bus 20 are various I/O controllers, including a controller 28 providing the hardware interface for the control buttons 16, and a controller 30 providing the hardware interface for the display 14. A controller 32 provides the hardware interface for a speaker 34.

Figure 3:
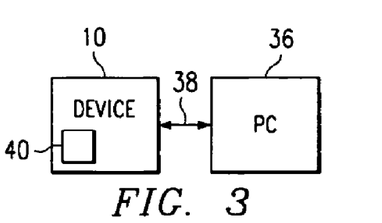
FIG. 3 is a block diagram of a device including a communication module to facilitate communication of the device.

One of the preferred implementations of the invention is as a set of instructions in a code module resident in the RAM 26 of the device. The set of instructions can however be stored in some other computer memory such as a hard disk drive of a personal computer (PC) or even downloaded from a server via the Internet until required by the device 10. As shown in FIG. 3, the device 10 can also include an integrated communication module 42 to facilitate wired and wireless communication. Communication can be had with remote resources 44 (e.g., servers) through network and to enable monitoring and feedback of field assessment operations. Wireless communication module 42 can include digital communication technology and/or wireless modem for facilitating local area communication. The module 46 also preferably uses wireless IP technology, which is also known as Cellular Digital Packet Data (CDPD). CDPD is a method of transmitting data in small packets of information over existing cellular phone networks. CDPD is a fully digital network overlay, providing all the benefits of digital service, including lower error rates and lower costs. Communications module 42 provides wireless real-time access to servers and personnel in support of assessments, and can also provide more traditional information available over networks, (e.g., e-mail, chat, Intranet and Internet information). Preferably, no plugging in or dialing up in needed through integration of the communication module 42 into a handheld device.

Figure 4:
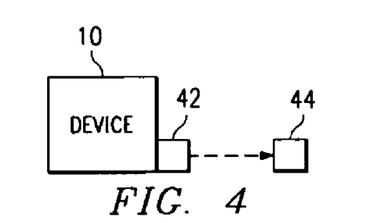
FIG. 4 is a block diagram showing an infrared communications link between the device and a personal computer.

As shown in FIG. 4, the device 10 can preferably communicate with a PC 36 through an infrared communications link 38 to exchange and update information both ways. This feature makes it particularly easy to update and change personal schedules as needed. The device 10 can include an integrated modem 40 to provide data transfer functions and for remote connectivity. This feature allows a person (such as a supervisor, counselor or service representative) remote from the user to provide tasks, answers to queries, notes and other information for use and display on the users device 10 using standard telecommunications technology (e.g., wired and wireless GSM, CDMA, CDPD, and paging networks).

Figure 5:
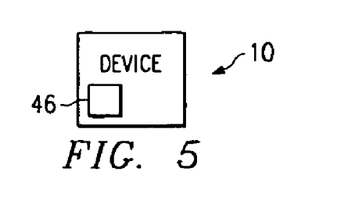
FIG. 5 is a block diagram showing a GPS module associated with the device.

Referring to FIG. 5, the handheld device can also be equipped within a position module 46 to enable the handheld device to utilize positioning systems or methods known in the art such as satellite position (e.g., Global Positioning System (GPS)) or signal triangulation techniques. A GPS compatible system, for example, can be used to determine a device location information and can also provide navigational assistance to users (e.g., to find a field problem/job) when used in combination with navigation software or resources, such as the Mapblast.com™ resource available from the World Wide Web. A navigation module will include positioning and navigational capabilities. Commercially available navigation technology will allow users to download a door-to-door route from any two locations in the U.S. The device will constantly update the user's current position and provide updated directions. This feature allows point to point navigational instructions to be provided to the users.

In accordance with the present invention, a handheld device 10 can be interactive with the field operator when programs operated by the microprocessor ask questions or provide guidance related to a particular field problem. An interactive question and answer session can also include the provision of checklists and relevant data in support of a user dialogue with the device. Interactivity can also be provided to remote resources when two-way communication is provided between the device and a remote server and/or support representative. As mentioned above, the present invention can be effectively practiced together with a client/server programming environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

With a client/server relationship, multiple client programs share the services of a common server. Client programs and Server programs are often part of a larger program or application. Relative to the Internet, a Web browser is a client program that requests services (the sending of Web pages or files) from a Web server (which technically is called a Hypertext Transport Protocol or HTTP server) in another computer somewhere on the Internet. Similarly, a computer with TCP/IP installed allows client requests for files from File Transfer Protocol (FTP) servers in other computers on the Internet.

Figure 6:
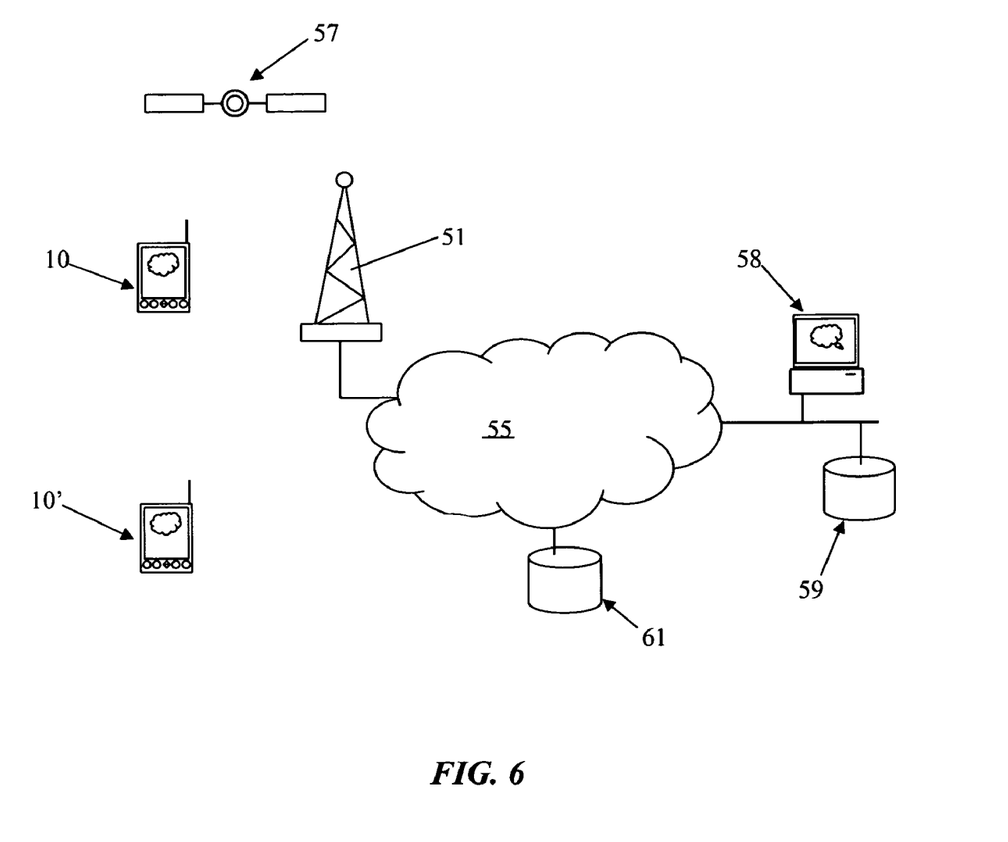
FIG. 6 an illustration of a basic operational environment for the handheld device and methods of the present invention.

Referring to FIG. 6, an environment for extended operation/communication between a handheld device 10 (client) and remote management system 58 (e.g., server, desktop PC) is illustrated. At least one device 10/10' can be remotely linked to a management system that can provide instructions (e.g., templates, task/punch lists) and/or programs to a group of users. Instruction can be stored on a program locally on a users personal digital assistant (PDA). Job templates and/or programs can also be centrally stored within one or more databases 61/59 accessible to management system or the directly by the handheld device 10/10'. Accordingly, users can access a central template through a private or public computer networks in a conventional manner via wireline or wireless communications. By maintaining a template in a central location, such as a management system, updates can be made to the template as procedures, best practices, and/or laws are added, amended or deleted. Accordingly, users can be provided with up-to-date information on assessment activities.

A user operating in the field can utilize a handheld device 10 for the assessment of a field problem. The user can execute an industry-specific program (e.g., field data management program) on the handheld device 10 related to the problem being addressed. The user interacts with the handheld executed program to obtain an initial field assessment. The program would prompt the user for input of data related to the problem. During program execution, the user can access remote resources (e.g., information, data, and expert assistance) via wireless communication systems 51 and networks 55. Information can be obtained from a server 58 located at the user=s enterprise, or from other network 55 resources available to the user (e.g., Web pages provided/obtained over the Internet). Real-time analysis of data obtained can also be undertaken by remote processor (e.g., server, desktop PC). At completion of data processing by a handheld device remote processor 10 a final output, such as a report, bid, recommendation, or the like can be provided to the user. The user can use the information to interact with a third party, render a final output for the third party, or to troubleshoot equipment. The remote processor (e.g., 58) can also be used as a collection point for data provided from multiple users (e.g., 10, 10'). The data would then be analyzed by the remote processor and a comprehensive report can result and be provided to the remote user/device location and data can also be provided via satellite 57. Location is determinable using, for example, GPS. A handheld device user can be provided with directions to a requested location, based on the user's position, either textually or through known mapping programs (e.g., Map Blast™).

It should be appreciated that data collected with the device 10 can be processed without the assistance of remote resources and can be directly utilized to render output to the user via the device user interface, printed using data rendering devices, or can be stored in local memory for subsequent use (e.g., synchronization with a desktop, rendering, remote computation, compilation for use with input from other sources).

Data provided to remote systems can generally undergo computing operations beyond the resident capabilities of the handheld device. A limited software program can be used for gathering of data during a field assessment, where after a larger software application and computing resources may be necessary to render a comprehensive analysis relating to the particular field problem. A smaller handheld executed program, for example, may only provide a device user with a more abbreviated list of questions needed to address a field problem. For example, a larger computing capability can utilize data collected by several handheld devices deployed to assess field problems.

Methods of the present invention are now described more fully hereinafter with reference to the accompanying drawings, in which preferred embodiments of the invention are shown. Methods of the invention can, however, be embodied in many different forms and should not be construed as limited to the embodiments (e.g., method step sequences) set forth herein; rather, these embodiments are provided so that this disclosure will be thorough and complete, and will fully convey the scope of the invention to those skilled in the art. It will be understood after the teachings herein provided that each block of the flowchart illustrations, and combinations of blocks in the flowchart illustrations, can be implemented by computer program instructions. These computer program instructions can be provided to a processor of a handheld device (e.g., PDA, pager, WAP phone), general purpose computer (e.g., desktop), special purpose computer (e.g., server), or other programmable data processing apparatus to produce a machine, such that the instructions, which execute via the processor of the handheld device, remote computer, server or other programmable data processing apparatus, create means for implementing the functions specified in the flowchart block or blocks. It is generally known that servers or desktop computers have more processing capability than handheld device. Furthermore, a server or desktop can be used as a centralized data collection and analysis facility for input received from more than one handheld device/user.

Figure 7:
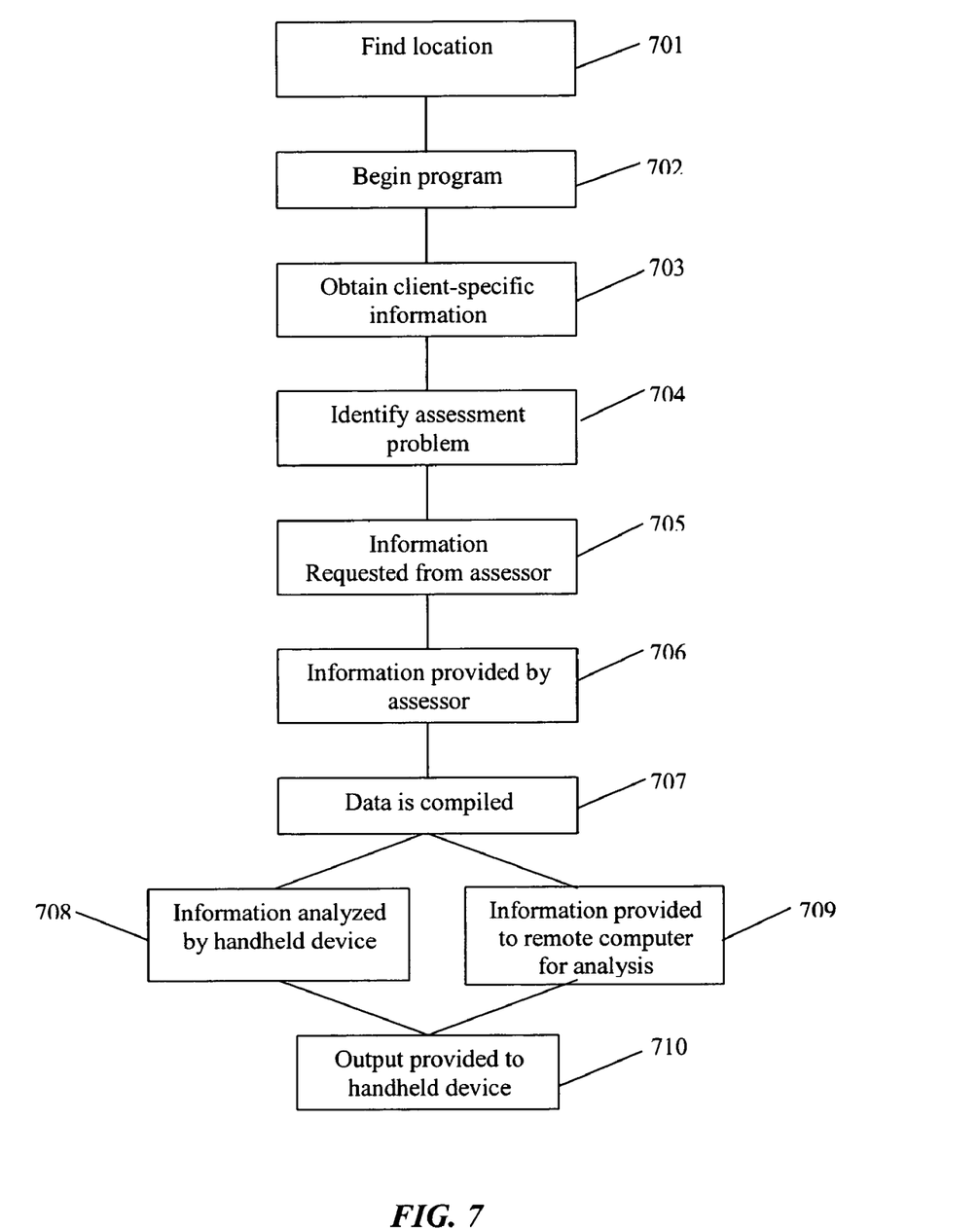
FIG. 7 illustrates a flow chart related to a construction industry in accordance with a method of the present invention.

Referring to FIG. 7, a flow chart related to a construction industry application will now be described. Again, the construction industry application is only exemplary of one type of field operation that can be facilitated with the present invention, and should not be taken as a limitation of the scope of the appended claims. An user can initially be directed to the prospective job site 701 through GPS navigation means on the handheld device relevant to a particular field problem. Once at the job site, the operator would start an appraisal program 702. The program can start by asking for the identification of a client or matter 703 (e.g., customer, or job site). The program can next ask the representative to identify the problem or type of operation or assessment 704 (e.g., service call, sales call, HVAC, plumbing, electrical, landscaping, etc.). This should enable the only the most relevant questions and/or interaction to be invoked by the program. The program would then start asking the user specific questions, or provide initial information, related to the identified subject matter 705. The user would respond to program questions by providing specific answers/data 706, which would generally be provided in a format understandable by the program. It is assumed that operators/users would have the requisite training to utilize field data management programs. Interaction, however, would preferably be kept to a level that is reasonably intuitive to any reasonably experienced computer and handheld device user. At completion of the series of questions, the handheld device can automatically compile collected data 707 provided by user. The data can then be analyzed by the handheld device 708 or provided the data to a remote processor 709 via a network where the data will be analyzed. Data can be provided to the remote resource within a template recognizable by the remote processor/program. After the data is analyzed, the handheld device can provide output to the operator 710 (which may have been received from the remote processor) that can be in the form of an estimate or analysis and can be provided to the client or utilized by the operator to provide additional services.

In an industry-specific application, a field operator in the construction industry can be required to provide job cost estimates, status reports and/or complete a punch list of items. Programs for estimating a job and rendering bids can be more detailed and interactive than the mere provision of task/punch lists. For example, a job estimation program tailored for the heating and air conditioning industry can determine cooling load requirements based on data collected regarding a floor plan (square footage, duct work, number of vents, position of vents), currently used equipment (furnace, air compressor, valves, coil, tubing, etc.), condition of equipment and insulation. Load calculations can also be rendered on-site based on available building plans where input to program questions is based on data written on a set of architectural plans. In the heating and air conditioning (HVAC) industry for example, an inexperienced technician would greatly benefit from the provision of guidelines for troubleshooting HVAC equipment, such as a series of questions related to identified failure symptoms or the identified problem. The handheld device can also provide a technician with an outline of known systematic procedures.

In the case where an inexperienced operator, such as the inexperienced HVAC technician described above, is unable to properly assess a field problem, a transcript of the operator's interaction with the handheld (e.g., questions and responses) can be transmitted to remote resources for further analysis. The user can be provided, at the handheld device with additional assessment guidelines (e.g., another program, suggestions/advice, or targeted questions not asked by the handheld device program) from a remote processor or source. The operator can also be provided with, for example, a link to third party information relevant to the problem available on the Internet (e.g., information from an equipment manufacturer=s site regarding the equipment being assessed by the technician).

Figure 8:
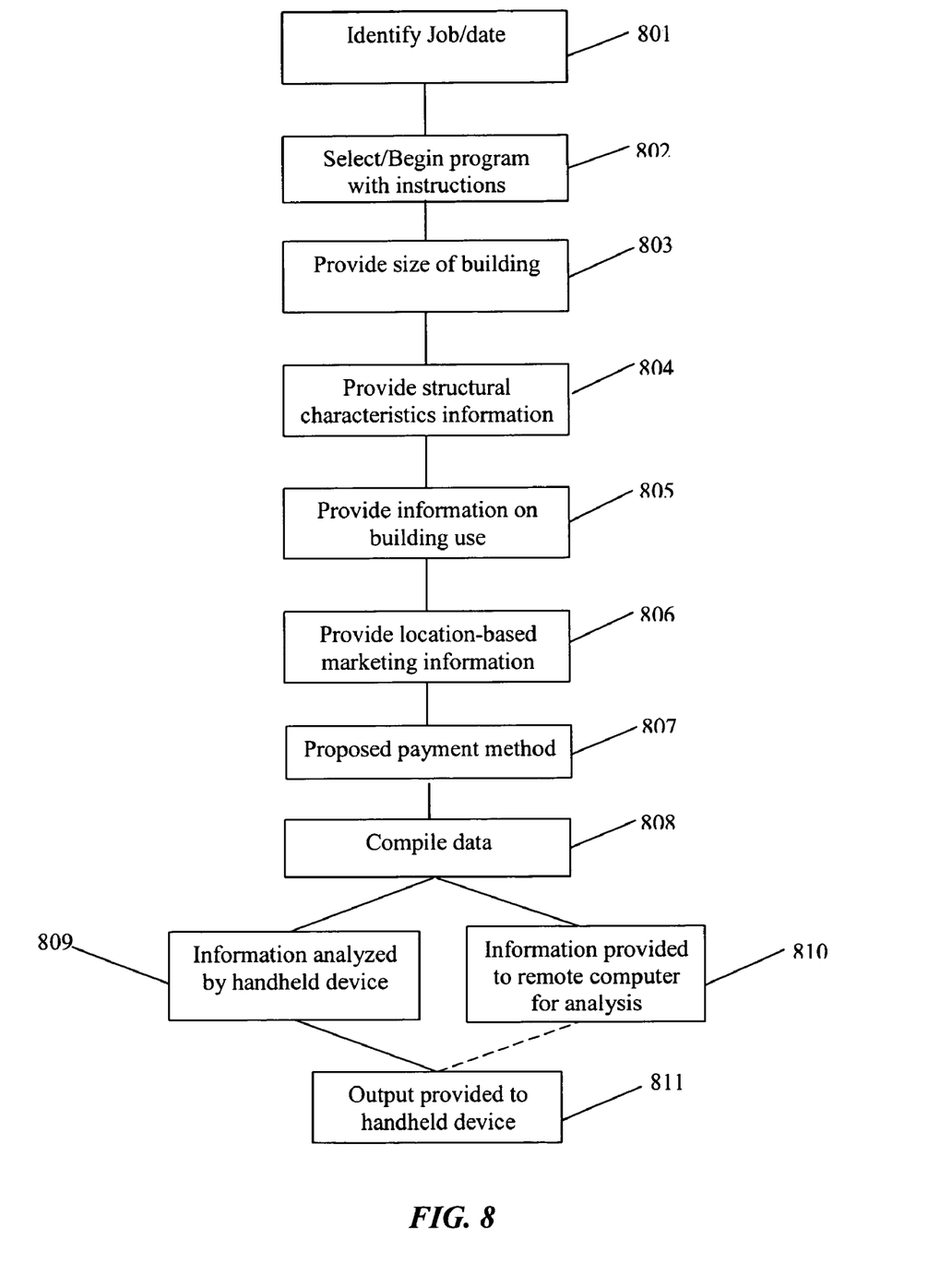
FIG. 8 illustrates a flow chart illustrating a more specific operation relating to the HVAC industry.

Referring to FIG. 8, a detailed flow chart illustrating a more specific assessment relating to the HVAC industry is described. The flow chart is directed to information useful in obtaining data needed to render an estimate for a HVAC project. Once a program is opened on the handheld device, the operator can be asked (e.g., prompted) to identify the job 801 (e.g., location, customer name, date, type of job). The current date may already be available from the handheld device, but in this case the projected start date can be provided for project scheduling (conflict checking) purposes. The operator can then select the type of program 802 to be utilized (e.g., HVAC sales estimating, problem trouble-shooting, and efficiency determination). The operator can next be asked for the approximate size of the building 803 being assessed (generally based on heated/cooled square footage for HVAC applications). A operator can then be asked to provide structural characteristics of the building 804 (e.g., glass-type and location, the direction a building faces for determining solar exposure, ceiling height and ceiling type). Other categories not shown but which may be relevant to assessing a building are wall type, insulation type/rating, duct work type/insulation, pre-existing equipment type/rating. Use of the building can also be determined by the operator 805 (e.g., how the building occupied and typical traffic patterns). The type of business, if applicable, can have an impact on the assessment regarding accessibility for equipment and commercial operation patterns. Finally, location (e.g., Dallas/Fort Worth factor) can have an impact on the market price for an estimate. It may make a difference whether a job is being performed in a particular part of town or what the immediate surroundings of the property are like.

Project location information can be provided by the handheld device automatically via a resident GPS module as described in FIG. 5 and throughout the disclosure; however, location-based marketing information 806 (e.g., street access, landscaping that may be disturbed, new construction issues) can also impact the project and overall assessment. Payment information 807 can also be obtained to complete information needed to render, for example, a job estimate. Compilation 808, analysis 809/810, and useful output 811 aspects of the method are carried out and rendered after all data is collected by the operator. Other construction related fields that would benefit from a series of questions similar to the last example include, remodeling, plumbing, inspections, surveying, landscaping, windows sales and installation, floor covering contractors, etc. It should be appreciated that estimates can also be provided in non-construction sales using the present method.

Figure 9:
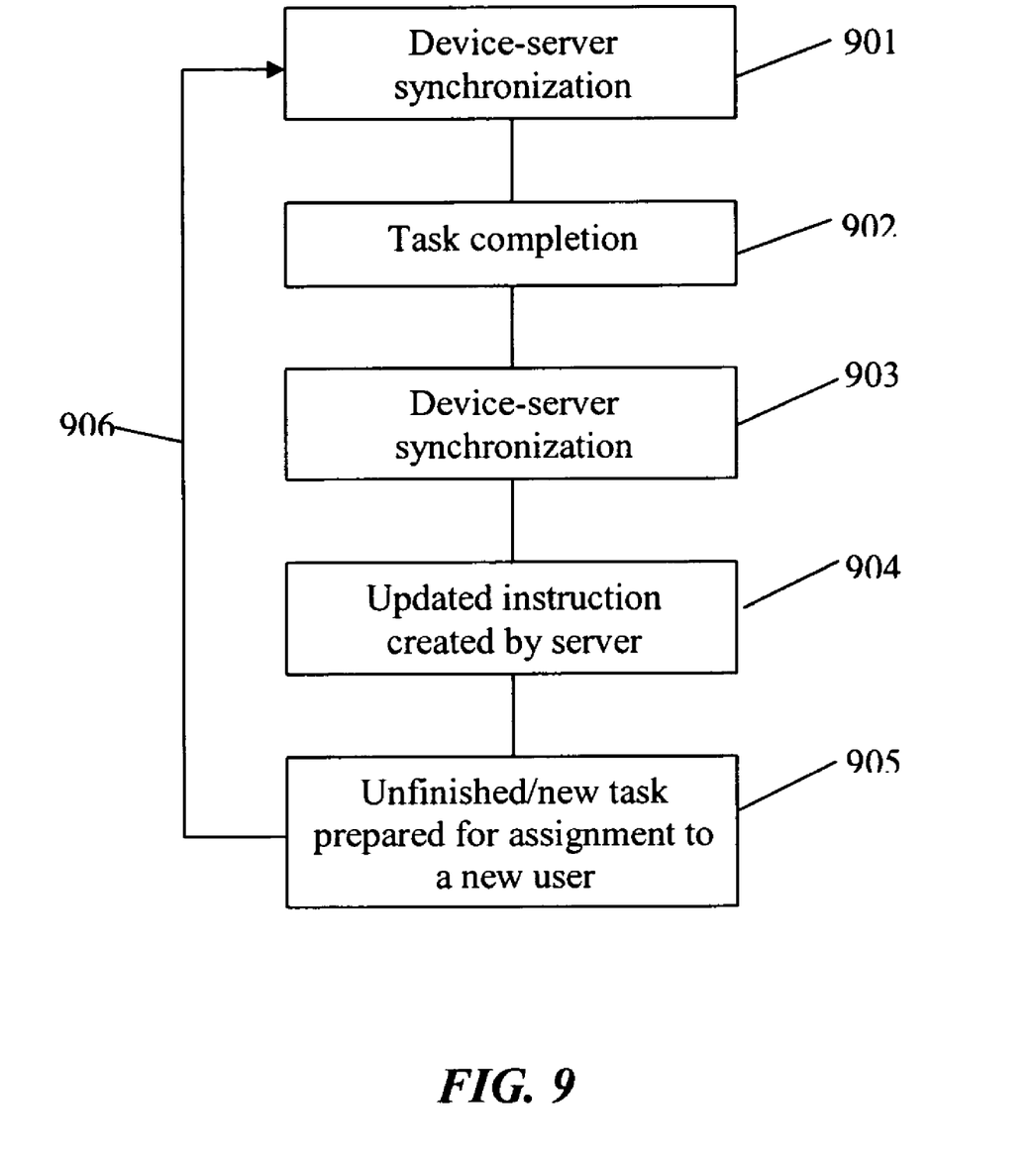
FIG. 9 illustrates a flow chart of a method relating to project management.

Referring to FIG. 9, a flow chart a method relating to project management is described. Oftentimes, large projects in, for example, a manufacturing or design environment can have job aspects that are shared by members belonging to different work shifts. In accordance with the present invention, a program managed by a central computer/server can track every aspect of a project and provide worker with tasks via a template. A worker's handheld device (or device assigned to the worker for the shift) can be synchronized 901 with a server to receive an updated template containing tasks for the worker at the beginning of every work shift. A project member beginning a workday at a job site or on a shared project would generally be expected to ascertain the status of the project and attempt to complete tasks embodied within a template. The projects tasks and template (or program instructions) are generally expected to be completed by the worker 902 during and before the end of a shift. The worker reports 903 on the status of tasks at the end of the workday via synchronization with a server through wired and/or wireless means as described at the beginning of the disclosure. An updated template is created by the server 904 for a subsequent worker based on the project's updated status, needs and prior worker input. Unfinished business recorded by a prior worker and new tasks can be prepared within a template 905 for provision to the subsequent device/worker. The process is repeated for the duration of assigned projects 906, and for subsequent (new) projects. It is an advantage of the present invention to provide for project tracking, updated progress, and focused task lists to projects members. Project efficiency would increase with the present method. Workers utilizing a synchronized project task list to carry out their daily input into a project can insure that task completed task are not repeated (wasting time) and that unfinished task are addressed by a subsequent project member, possibly avoiding project delays and/or damages (e.g., monetary loss based on inefficiency).

Figure 10:
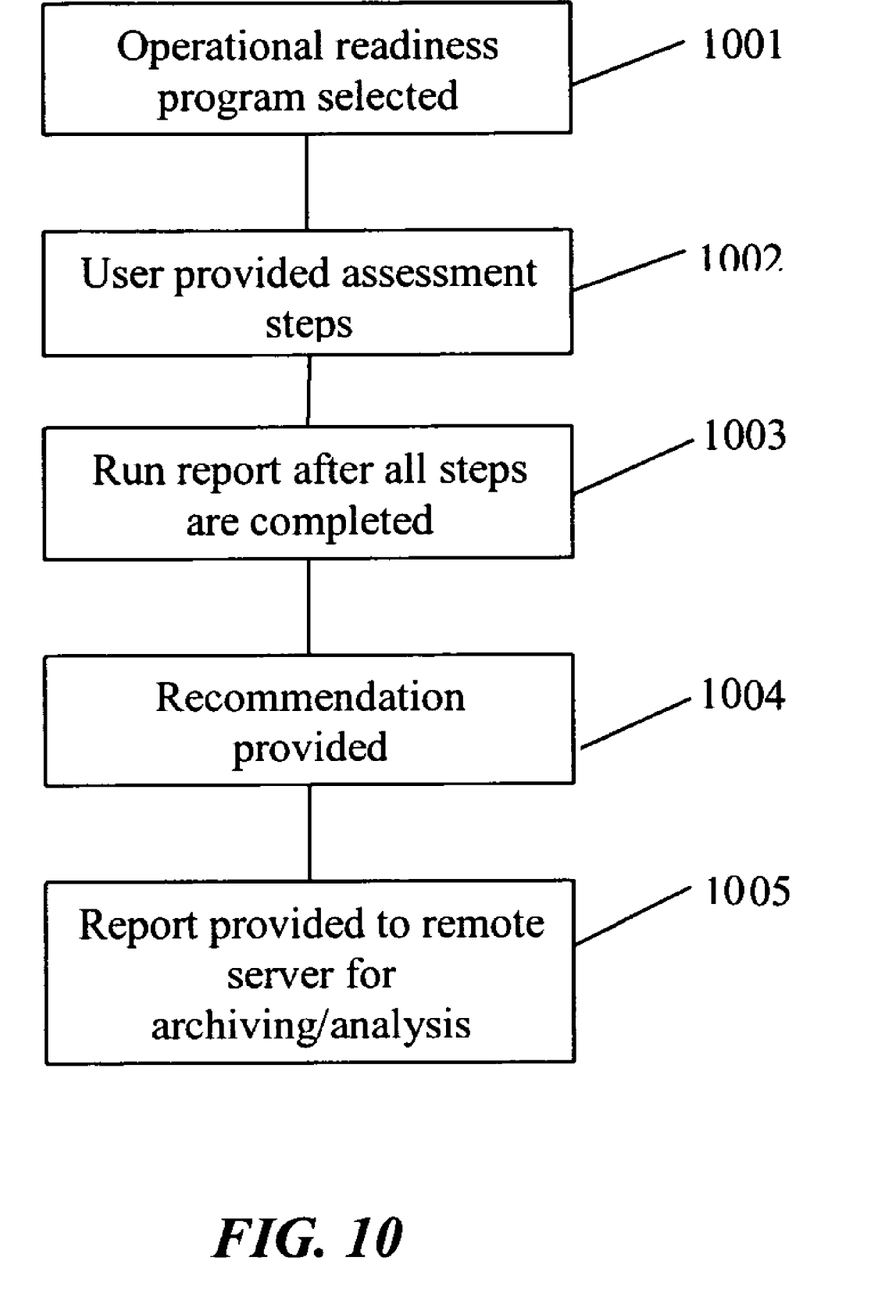
FIG. 10 illustrates a flow chart outlining a method relating to equipment readiness.

Referring to FIG. 10, a flow chart outlining a method relating to equipment readiness is described. An example relating to equipment readiness in the airline industry will be used, but is not meant to be limiting. Airline pilots generally work through a manual checklist prior to the operation of aircraft. In accordance with the present invention, a pilot can utilize a program executed on a handheld device to be guided through an equipment readiness checklist. The operator (pilot) selects the operational readiness program associated with the equipment being check 1001. The program provides the operator with step-by-step instructions for checking the status of the equipment 1002. The checklist can be provided in the form of questions or statement (e.g., provide X gauge reading). Upon completion of the checklist, the user can run a report 1003 (or synchronized with a remote server for use by the system or monitors) describing the readiness (pass/fail) of the equipment. The report can include recommendations 1004 (e.g., troubleshooting criteria). Trouble shooting information together with a template of field test procedures can be provided to equipment technicians for repairing disorders. The report can be transmitted to a remote server 1005 for reporting/analysis. For example, the report (which preferably contains quantitative readings) can be synchronized with a black box located on an airplane. If there would ever be an issue as to whether equipment was properly checked out or if certain readings are indicative of causing equipment failures, the recorded information of the checklist would be useful in analyzing such issues.

Figure 11:
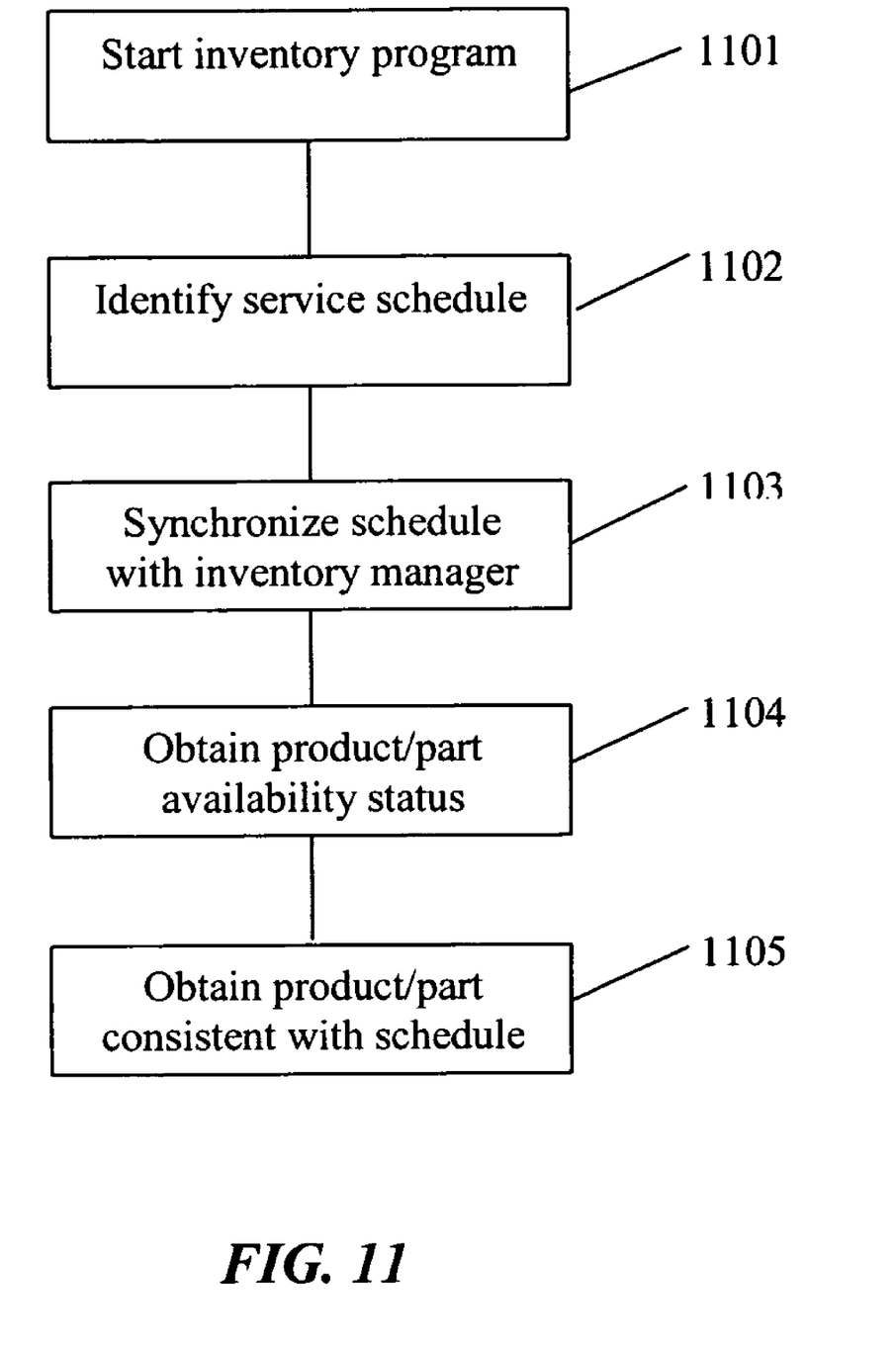
FIG. 11 illustrates a flow chart outlining a method relating to inventory tracking/ordering.

Referring to FIG. 11, a flow chart outlining a method relating to inventory tracking/ordering is described. Field technicians can utilize a handheld device to ensure that the proper inventory will be provided prior to embarking on a daily service schedule. The operator can start an inventory program 1101, identify a service schedule 1102, and synchronize the schedule 1103 with an inventory manager. The inventory manager assesses the schedule requirements and provides the technician with an inventory availability status 1104. The technician can coordinate inventory needs with the company automatically using this method so that no more inventory than is needed is taken to the field.

Figure 12:
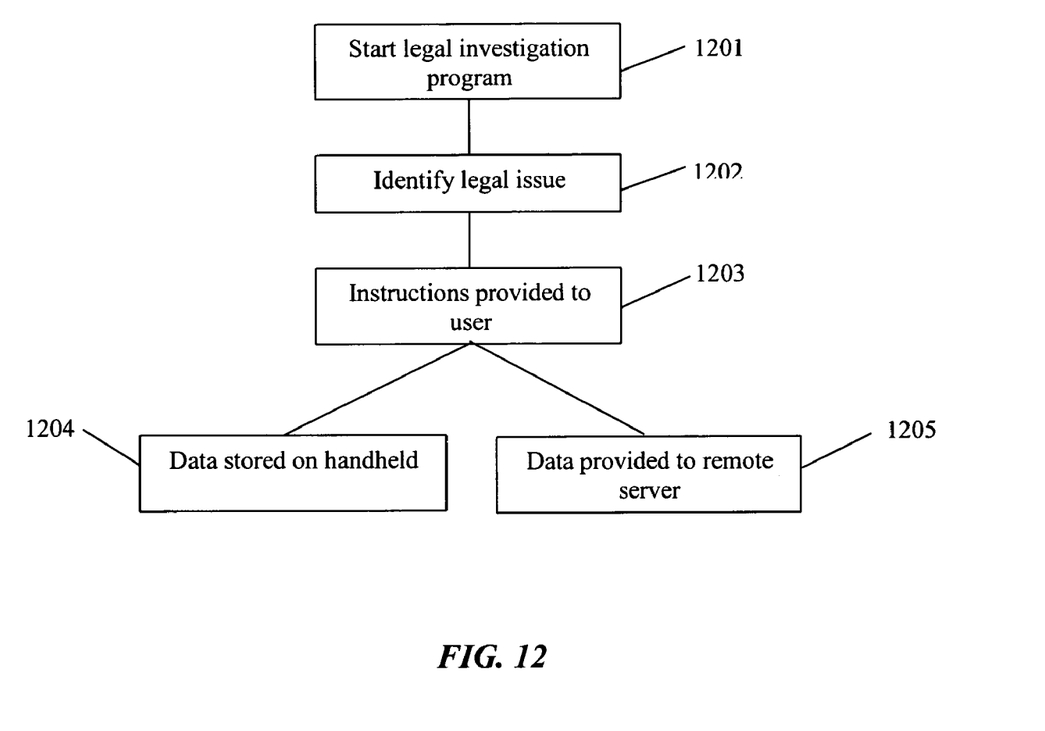
FIG. 12 illustrates a flow chart illustrating a field operation relating to conducting a criminal investigation.

Referring to FIG. 12, a flow chart illustrating an assessment relating to criminal investigation is described. Once the program opened 1201 on the hand held device, it can ask the operator to identify legal issues (e.g., crime) 1202. The operator can then select the type of investigation being undertaken (e.g., crime scene, witness interviews, forensics, etc.). Instructions can be provided regarding the legal elements of a specific crime and exemplary evidence needed to prove the elements. The checklist and legal elements can be tailored to a particular legal jurisdiction. The investigator can complete instructions by entering data relating to the investigation 1203. The checklist and/or data can be stored at the handheld 1204 for future reference, can be transmitted 1205 to a server for analysis (verification), and/or synchronized with computer for use in furtherance of an investigation. The ability to manage data from several investigators on large-scaled cases can be enhanced through the present invention, wherein comprehensive data form different sources can be analyzed, updated and reformatted for representation and distribution to plural case workers. Updated templates associated to a particular type of case can identify information shortfalls in a case.

Figure 13:
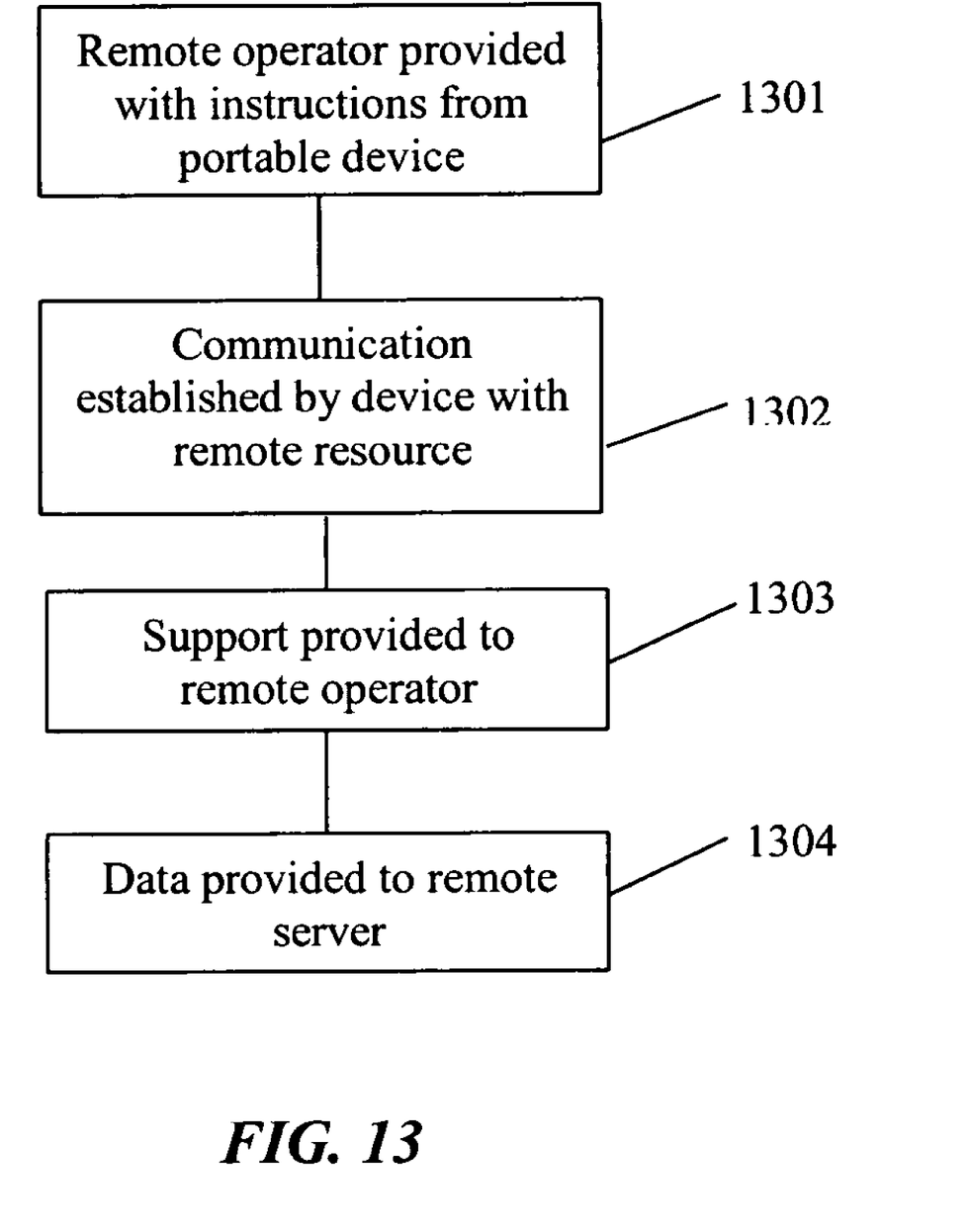
FIG. 13 illustrates a flow chart directed to multi-user functions in accordance with carrying out aspects of the present invention.

Referring to FIG. 13, a flow chart directed to multi-user functions in accordance with the teaching of the present invention is provided. As an example to describe a multi-user field assessment, assume several field operators/investigators are deployed to investigate and collect data over a broad area of land affected by an environmental catastrophe. Operators equipped with handheld devices are assigned/deployed to specific positions of the affected environment. An operator can first be provided initial instruction from a remote server 1301. Initial instructions can include summary information regarding the problem, required equipment, and Pinpoint directions to the assigned positions, which can be provided to operators utilizing GPS. In cases where an operator may already be deployed, the operator may only be provided with initial information/instructions. At their respective positions, remote operators are provided instruction from a portable device 1301. Communications is established between device and remote resource 1302. comprising unique/updated instructions for their respective assessment of the position (e.g., data collection instructions). The template/instructions can operate in combination with programs resident in the handheld computer or can be accompanied by a computer program transmitted from the serer (e.g., in the form of a JAVA applet).

During data collection, the operator can gain support 1303, via communicates with remote resource (e.g., server, exert personnel). With and expert, communication can be via chat or voice. Procedural guidance can be provided through two-way communication with remote representatives. After the data has been collected in accordance with the template/programs, the data can be transmitted to the resource 1304, wherein the data can be quickly and more accurately analyzed together with input from other personnel (e.g, experts, other field users). In the case where initial GPS information was not provided to/or obtained from the operator, GPS coordinates associated with the collected data can also be transmitted to the server with the collected data. The collected data and GPS coordinate associated with the collection of data would generally be the two most important attributes for the given scenario.

As will be appreciated by one of skill in the art, the present invention can be embodied as methods, data processing system, or computer program product. Accordingly, the present invention can take the form of an entirely hardware embodiment, an entirely software embodiment or an embodiment combining software and hardware aspects. Furthermore, the present invention can take the form of a computer program product on a computer-usable storage medium having computer-usable program code means embodied in the medium. Any suitable computer readable medium can be utilized including hard disks, CD-ROMs, optical storage devices, or magnetic storage devices.

Computer program code for carrying out operations of the present invention can be written in an object oriented programming language such as Java., Smalltalk or C++. The computer program code for carrying out operations of the present invention, however, can also be written in conventional procedural programming languages, such as the "C" programming language. The program code can be executed entirely on the user's computer, as a stand-alone software package, or it can execute partly on the user's computer and partly on a remote computer. In the latter scenario, the remote computer can be connected to the user's computer through a LAN or a WAN, or the connection can be made to an external computer (for example, through the Internet using an Internet Service Provider).

Personnel that can benefit from the assessment solutions provided herein include members of the construction, legal, medical, technical, hospitality, military and educational communities. The use of words such as "assessments" as used herein is not meant to limit the invention. Facilitating user "operations" in the field, remote from his/her enterprise is the focus of the present invention. Examples of field assessments include, job estimates/bids, crime scene investigations, medical procedures, daily punch/task list management, equipment/system testing/troubleshooting, customer interaction, sales, cost estimates, and third-party status/feedback collection. Accomplishment of an assessment can includes methods for guided, interactive data collection by handheld computing device users, and storage and/or transmission of collected data for computer analysis. Data, once analyzed by a computer, can result in a complete assessment of or a request for additional data collection by the user.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

The invention claimed is:

1. A handheld device for use in conducting operations in the field and for the management of data during operations in the field, comprising:
   a memory for storing programs including at least one field data management program and related data, wherein programs stored in said memory enable a user to: find a field location, collect data at the field location, wirelessly access remote resources while at the field location, provide data to a remote resource, and retrieve data related to the operation from said remote resource;
   a microprocessor for executing programs including said at least one field data management program, wherein execution of said program includes execution of programming instructions enabling a user to: find a field location, collect data at the field location, wirelessly access remote resources while at the field location, provide data to a remote resource, and retrieve data related to the operation from said remote resource;
   a display for viewing field related data, mapped direction to field locations and third party information retrieved from the Internet;
   a wireless communication module for providing access to the remote resources for access to data and support from remote personnel and to enable a user of the handheld device to obtain data including field operation instructions, real-time guidance and access to third party information in support of a field operation from the Internet using said handheld data management device;
   a positioning and navigational means for determining the handheld data management device location and providing navigable directions to the user of the handheld data management device on a map, thereby enabling the user to find a field location; and
   a user interface adapted for enabling the user to interact with the handheld device, said programming instructions and said at least one field data management program.

2. The handheld data management device of claim 1, further comprising a GPS as said positioning module for providing handheld device location identification in support of instructions enabling the user to find a field location.

3. The handheld data management device of claim 1, wherein said at least one field data management program stored within said memory and includes instructions for the handheld data management device user to collect and retrieve data related to at least one of: construction industry project analysis, HVAC system analysis1 project management, equipment readiness inspection, equipment troubleshooting, remote inventory tracking, inventory ordering, carrying out a sale, providing cost estimates to customers, customer invoicing, conducting legal investigations in the field, field data collection, and multi-user remote function coordination.

4. A method for managing data in the field using a handheld field data management device, comprising:
   providing a handheld field data management device to a user to enable the user to manage data collected a a field operation location, wherein said field data management device includes:
      a memory containing at least one field data management program module for providing instructions enabling a handheld field assessment device user to find a field operation location, collect industry-specific data at the field operation location, communicate and transfer data to and from a remote server, and including instructions enabling the user to manage inventory and data related to the inventory; a microprocessor executing said at least one field data management program; a positioning module providing handheld device location identification; a user interface adapted for enabling the handheld data management device user to interact with said at least one field data management program; and a wireless communication module for providing communications between the handheld field assessment device and the remote server;
   enabling the user to start an inventory program from a handheld data management device, said program used to ensure that the proper inventory will be provided to the handheld data management device user prior to the user undertaking a daily field service schedule;
   enabling the user to identify service schedule requirements;
   enabling the user to synchronize the schedule with inventory data stored in a server wirelessly accessible by said handheld data management device;
   said handheld management device adapted to conduct in cooperation with the server an assessment of service schedule requirements and available inventory;
   providing the user with inventory availability status through the handheld data management device that is based on inventory needs identified in said service schedule;
   enabling the user to access instructions from at least one field data management program to assist the user in finding a field operation location;
   enabling the user to access instructions from at least one field data management program to assist the user in collecting industry-specific data at the field operation location; and
   enabling the user to access instructions from at least one field data management program to assist the user to communicate with a remote server using the handheld field data management device before, during and after the collection of industry-specific data.

5. The method of claim 4 wherein inventory needed and available for said service schedule are reserved through said program and said server to an inventory supplier, and wherein needed inventory is available to the user for scheduled service calls.

6. A method for managing data during a field operation using a handheld field data management device, comprising the steps of:

providing a handheld field data management device to a user, said handheld field data management device configured to enable the user to manage data collected at a field operation location, wherein said field data management device includes:
   a memory containing at least one field data management program module for working with a microprocessor to process instructions enabling a handheld field assessment device user to find a field operation location, collect industry-specific data at the field operation location, and communicate in real-time with a remote server to transfer data to and from a remote server, obtain updated instructions or procedures, and for retrieving third party information useful for the field operation from the Internet;
   a microprocessor executing said at least one field data management program;
   a positioning module including GPS for determining handheld device location and configured to coordinate with mapping software to provide map directions to field operation locations;
   a display for viewing field related data, maps and third party information retrieved from the Internet;
   a user interface adapted for enabling the handheld data management device user to interact with said at least one field data management program; and
   a wireless communication module for providing communications between the handheld field assessment device and the remote server, and for providing communications with third party resources from the Internet in support of field operations;
enabling the user to access instructions including mapped directions from at least one of said field data management program and said remote sever to assist the user in finding a field operation location based on the location of the handheld field data management device;
enabling the user to access instructions from said at least one field data management program to assist the user in collecting industry-specific data at the field operation location; and
enabling the user to access instructions from said at least one field data management program to assist the user in communicating with a remote server using the handheld field data management device before, during and after the collection of industry-specific data at the field operation location.

7. The method of claim 6, wherein said at least one field data management program includes instructions enabling the user to carry out a crime scene investigation and said industry-specific data includes information related to the collection of crime scene data, said instructions comprising the steps of:
   starting a legal investigation program within a jurisdiction identified as the field operation location;
   identifying the subject matter for the legal investigation;
   obtaining investigative requirements including procedural rules and laws applicable to the jurisdiction identified as the field operation location and applicable to the subject matter identified for legal investigation, said investigative requirements obtained from at least one of the remote server or the Internet based on the GPS location of said handheld field data management device; and
   obtaining guidance through the handheld data management device to perform a compliant legal investigation.

8. The method of claim 7, said guidance and said investigative requirements further enabling the user to carry out the steps of:
   collecting factual data at the jurisdiction in accordance with the guidance;
   entering the factual data into the handheld data management device; and
   wirelessly communicating said data entered into said handheld data management device to a remote server for real-time remote analysis.

9. The method of claim 6, wherein said at least one field data management program includes instructions enabling the user to troubleshoot a field problem and collect data related to the field problem, said instructions comprising the steps of:
   starting an assessment program associated with a field problem;
   providing information related to the field problem as requested by the field data management program;
   enabling analysis of said specific information by the user and said handheld data management device; and
   rendering post-analysis instructions from said handheld data management device for use in resolving the field problem.

10. The method of claim 9, wherein said analysis includes communication and support through a remote server.

11. The method of claim 9, wherein said analysis includes communication with and support from a remote expert over a communications network.

12. The method of claim 11, wherein said step of providing data to a remote resource for analysis includes communications providing industry-specific data to the remote expert as query message from the user.

13. The method of claim 12, wherein data from said remote resource is a response message provided by said remote counselor in response to said query message, and wherein said response message includes supporting data files.

14. The method of claim 9, further comprising:
   providing data to a remote resource for analysis; and
   retrieving enhanced data from said remote resource for use in conducting the field assessment.

15. The method of claim 9, further comprising:
   providing two-way communication between remote computing means and handheld data management devices to facilitate real-time access to remote programs, assistance and/or information related to the field assessment being undertaken by using a handheld data management device user.

16. The method of claim 15, wherein data is provided to said remote resource in the form of a query message from a field operator to a remote counselor and enhanced data from said remote resource is a response message provided by said remote counselor in response to said query message.

17. The method of claim 9, further comprising accessing a remote data resource for retrieving data in support of said assessment.

18. The method of claim 17 wherein said data resource is a third party database accessible over the Internet.

* * * * *